Patented Feb. 28, 1939

2,148,952

UNITED STATES PATENT OFFICE 2,148,952

PROCESS FOR PREPARING CELLULOSE ETHERS AND PRODUCTS

Robert W. Maxwell, Wilmington, Del., assignor to E. I. du Pont de Nemours & Company, Wilmington, Del., a corporation of Delaware No Drawing. Application April 15, 1937, Serial No. 137,144

7 Claims. (Cl. 260—231)

This invention relates to new and improved thickening agents, more particularly it relates to thickening agents derived from cellulosic derivatives, still more particularly it relates to cellulose ethers of extraordinarily high viscosity, and still more particularly it relates to stable cellulose ethers of high viscosity. It further relates to processes of preparing agents of the above type.

The simple cellulose ethers, particularly of the water-soluble type, have found wide utility as thickening agents because of their viscosity and stability. Their thickening power, however, does not equal that of some of the naturally occurring thickening materials such as gum tragacanth, Irish moss, etc. Consequently, in many instances they cannot be used successfully. Since, in most instances, the only function of a thickening agent is to provide body, it makes little difference in many cases how much agent is present. However, for some purposes it is desirable to have as little thickening agent present as possible, for example in the preparation of printing pastes to be used in printing textiles.

This invention has as an object the preparation of new and improved thickening agents. A further object is the preparation of new and improved thickening agents containing cellulose ether groups. A still further object is the preparation of cellulose ethers which are water-soluble and are further characterized by unusually high viscosities. A still further object is the production of cellulose ethers which have a thickening power greater than natural agents such as gum tragacanth. Other objects include the preparation of new and improved cellulose ethers in commercial quantities, the preparation of cellulose ethers which are water-soluble and can be used in printing pastes. Other objects are in general an advancement of the art. Still further objects will appear hereinafter.

These objects are accomplished by the following invention wherein cellulose is reacted with monofunctional and bifunctional etherifying agents, the monofunctional reagent being used in such proportions and under such conditions as normally give a soluble product and the bifunctional reagent being used under such conditions that at least two of the functional groups react in part, the action of the bifunctional reagent being stopped at such a point that a pronounced increase in viscosity is obtained but before the point of complete insolubility is reached. The preparation of soluble cellulose ethers is well known and requires no description here. The term "soluble" as used in this invention refers to solubility in any solvent including dilute caustic alkalis at low temperatures, room temperatures, or in water or organic solvents. The process of the present invention can be used in conjunction with any of the well known processes for preparing soluble cellulose ethers and so far as I have been able to determine is applicable to all such ethers. The action of the bifunctional reagents may be effected either before or after or simultaneously with the action of the monofunctional reagent. In general, any etherifying agent which reacts bifunctionally toward celulose will serve. However, it is preferred to use active bifunctional etherifying reagents such as epichlorhydrin, glycerin dichlorhydrin, beta:beta'-dichlorodiethyl ether, etc., because these agents lead to products of good solubility.

The quantity of bifunctional etherifying agent to be used depends greatly upon the nature of the bifunctional reagent itself and upon the conditions of the reaction. I have found that whereas large proportions of bifunctional etherifying reagents lead to insoluble cellulose derivatives, very small proportions lead to products which are soluble and are of increased viscosity which makes them of great value. This discovery forms an important feature of this invention. In general, not more than 0.25 mol of bifunctional reagent will be required to be substituted per mol (calculated as the glucose unit) of cellulose, and in some instances 0.1 mol is sufficient. However, with inefficient etherification reactions where a part of the bifunctional reagent is converted to by-products it may be necessary to introduce larger amounts of the reagent into the reaction mixture. In other instances where reaction is very efficient 0.25 mol used in the reaction mixture may lead to insoluble products. In practice, I limit the quantity of bifunctional etherifying reagent which is reacted with the cellulose by stopping its action before a sufficient degree of etherification has been effected by the bifunctional reagent to give an insoluble final product. This limitation may be effected either by the use of an excess of etherifying reagent for a limited time or by the use of a limited quantity of reagent, the action of which is allowed to proceed to completion.

As before stated the quantity of bifunctional etherifying reagent to be used depends upon the nature of the reagent itself and the nature of the cellulose or cellulose derivative reactant, as well as upon the conditions of the reaction. Quantities as low as 0.0005 of a mol of a bifunctional etherifying agent give significant increases in viscosity. The range of from 0.01 to 0.1 mol represents the preferred amounts to be used since appreciable increases in viscosity are obtained when these amounts are used yet insolubility does not usually occur.

The reaction of cellulose with the mono- and bi-functional etherifying agents may be carried out simultaneously or consecutively and when carried out consecutively the two reagents may be used in either order. Regardless of the order of etherification the mono-functional reagent is substituted to a degree to form a soluble ether with the cellulose present and the bi-functional reagent is substituted to a degree to form, by reaction with this soluble ether, a product which is still soluble but is of increased viscosity, and contains both mono- and bi-functional residues.

Whether the two etherification reactions are to be conducted simultaneously or consecutively it is convenient to determine the amount of each group to be substituted to give any required final viscosity by reacting the cellulose first with a monofunctional reagent to give a soluble product and then reacting this soluble product with the bi-functional reagent, stopping the reaction when the desired increase in viscosity has been effected. When the reactions are to be carried out simultaneously it is most convenient to insure the desired final result by introducing into the reaction mixture the required amount of each reagent as determined above and continuing the reaction to completion.

As starting materials for the process, there may be used any of the cellulosic materials commonly used for etherification. This includes principally cellulose itself and low substituted cellulose ethers. Where a soluble cellulose derivative is used the reaction may be allowed to proceed in solution. This procedure gives products of most perfect solubility. The products obtained when a bifunctional reagent is allowed to react on cellulose itself or in an ordinary etherification mixture with a monofunctional reagent are sometimes of imperfect solubility having what is known in the art as a grainy or "apple sauce" consistency. Since this property in no way reduces the applicability of these materials as thickening agents, the term "soluble" as used in this invention is considered to include all those products whose solubility is of a satisfactory degree for general use as a thickening material.

The invention will be further illustrated but is not limited by the following examples in which the quantities are stated in parts by weight.

*Example I*

This example illustrates the treatment of an alkali-soluble cellulose ether in solution with a bifunctional etherifying agent.

To 60 parts of a 7% solution of alkali-soluble cellulose glycolic acid, in 6% sodium hydroxide, was added 0.25 part of epichlorhydrin (0.1 mol for each mol of cellulose glycolic acid) and the mixture was well stirred. After standing for twelve hours at room temperature, the solution had a viscosity ten times that of the original solution.

*Example II*

This example illustrates the treatment of an alkali-soluble cellulose ether in solution with a bifunctional etherifying agent for cellulose.

The procedure was the same as in Example I except that 0.5 part (0.2 mol for each mol of cellulose glycolic acid) of epichlorhydrin was used. After twelve hours the product was a smooth solution of such high viscosity that it could scarcely be poured.

*Example III*

This example illustrates the simultaneous reaction of a monofunctional and bifunctional etherifying agent on cellulose. It also illustrates one method of carrying out a test to determine the proper quantity of bifunctional etherifying agent to be used in the reaction.

Six separate preparations of ethyl cellulose were made which were exactly alike except for the addition of varying quantities of dichlorodiethyl ether to the reaction mixture.

(a) *Control.*—One thousand (1000) parts of cotton linters pulp (3% moisture) were steeped in 50% sodium hydroxide solution for one hour, pressed to a weight of 3288 parts and shredded at 15°–20° C. for one hour, 1139 parts of dry flake sodium hydroxide being added and shredded in over the hour. The alkali cellulose so prepared was placed in a nickel-lined autoclave, 73 parts of water, 5660 parts of benzene and 3488 parts of ethyl chloride added, and the temperature raised over a period of two and one-half hours to 150° C. This temperature was maintained for six hours. The autoclave was then allowed to cool to room temperature, the reaction mixture poured into a considerable volume of water, neutralized, live steam passed through to remove the benzene, washed and dried. The resulting ethyl cellulose was soluble in a wide variety of solvents including a toluene-alcohol mixture (80–20).

(b) Same as (a) but with the addition of 3.5 parts ($1/240$ mol per mol of cellulose) of dichlorodiethyl ether to the reaction mixture. This gave a product soluble in the same solvents as the ethyl cellulose above to give solutions having from two to three times the viscosity of the control.

(c) Same as (a) but with the addition of 7 parts ($1/120$ mol per mol of cellulose) of dichlorodiethyl ether to the reaction mixture. The product gave a grainy solution of very high viscosity in a toluene-alcohol mixture (80–20).

(d) Same as (a) but with addition of 10 parts (about $1/85$ mol per mol of cellulose) of dichlorodiethyl ether to the reaction mixture. This product was highly swollen in a toluene-alcohol mixture (80–20) but was insoluble.

(e) Same as (a) but with addition of 36 parts (about $1/24$ mol per mol of cellulose) of dichlorodiethyl ether to the reaction mixture. The product was fibrous and insoluble.

(f) Same as (a) but with addition of 429 parts (about 0.5 mol per mol of cellulose) of dichlorodiethyl ether to the reaction mixture. The product was fibrous and insoluble although the ethoxyl content was 46.41%.

*Example IV*

This example illustrates the treatment of a water-soluble partially substituted methyl cellulose with a bifunctional etherifying agent to give a water-soluble methyl cellulose of increased viscosity.

To 60 parts of a 7% solution of water-soluble methyl cellulose in 6% sodium hydroxide was added 0.25 part (about 0.1 mol for each mol of methyl cellulose) of epichlorhydrin and the mixture well stirred. After standing for twelve hours at room temperature, the solution had doubled in viscosity.

Examples V and VI illustrate the simultaneous reaction of epichlorhydrin and sodium chloroacetate on cellulose in the presence of alkali to give a water-soluble sodium cellulose glycolate of extremely high viscosity.

Example V

One hundred twenty (120) parts of sulfite cellulose were steeped in a solution of sodium chloroacetate composed of 117 parts of sodium chloroacetate and 123 parts of water. After two hours the sheets were pressed to 300 parts. This gave 0.75 mol of sodium chloroacetate per mol of air dry sulfite cellulose. The material was then placed in a shredder and over a period of twenty minutes 90 parts of sodium hydroxide in 90 parts of water were shredded in, the temperature being held at approximately 25° C. After one hour 2 parts of epichlorhydrin in 50 parts of dioxan were added. After another hour 50 more parts of sodium hydroxide and 50 parts of water were sprayed in and 90 parts of sodium chloroacetate were added in dry form. Shredding was continued at 25° C. for eighteen hours. The product gave a very viscous solution in 2% concentration. The product was removed from the shredder and dissolved in water. A 3% neutral solution of the product was much more viscous than a 6% solution of sodium cellulose glycolate which had been made by an identical procedure except that no epichlorhydrin was added.

Example VI

The same procedure was followed as in Example V except 4 parts of epichlorhydrin in 50 parts of dioxan were added. The product was not quite as soluble as that of Example V but it formed a more viscous, pasty solution. A 1.7% solution of the product was a stiff paste which could be scarcely poured out of a beaker.

Example VII

The following example illustrates the treatment of alkali cellulose with a polyfunctional reagent followed by treatment with an etherifying agent to give a water-soluble cellulose ether.

One hundred twenty (120) parts of sulfite cellulose were steeped for one hour at 25° C. in a solution of 25% sodium hydroxide. After pressing to 360 parts the material was placed in a shredder of the Werner-Pfleiderer type and after shredding for about fifteen minutes 2 parts of glycerin dichlorohydrin in 50 parts of ethyl alcohol were sprayed into the mass. The mixture was shredded for four hours at 25° C. after which 180 parts of dry sodium chloroacetate were added and shredding continued at 20° C. for another six hours. The product was removed from the shredder and allowed to age for sixteen more hours at 25° C. after which it was purified by washing with 70% aqueous methanol containing a little acetic acid to neutralize the remaining sodium hydroxide. Solutions of the product in 0.5% concentration were very viscous and exhibited a tendency to gel upon standing for periods of several days. A sodium cellulose glycolate prepared in the same manner except that no dichlorohydrin was added was quite fluid in 2% concentration and showed no tendency to gel. A 2% aqueous solution of the second product was less viscous than a 1% aqueous solution of the first.

Treatment of the cellulose with the bifunctional etherifying agent before reaction with the monofunctional reagent is particularly advantageous because the bifunctional reagent can often be introduced into the alkali cellulose during the shredding period and can be allowed to react while the alkali cellulose ages. Where the bifunctional reagent is of low reactivity, however, this procedure is less desirable unless fairly vigorous reaction conditions are used. This is not to be desired because of the severe degradation which the cellulose undergoes. In such instances it is best to incorporate the reagent directly into the cellulose monofunctional etherifying agent reaction mixture. The efficiency of various bifunctional reagents when used with etherifying mixtures varies considerably depending upon the nature of the monofunctional groups. Thus, with methyl and ethyl chloride an extremely small quantity of beta:beta'-dichlorodiethyl ether is required to give an appreciable viscosity increase. This is illustrated by Example IV. On the other hand, with the use of less reactive etherifying agents such as butyl chloride a considerably greater quantity is required in order to achieve a satisfactory result. However, in the preparation of a mixed ethyl-butyl ether in which a mixture of ethyl chloride, butyl chloride and dichlorodiethyl ether is used, a small quantity of bifunctional etherifying agent is again sufficient. By this procedure, products increased in viscosity from 25% to 1000% or more are obtained without difficulty. Best solubility is obtained where the viscosity increase is limited to about 400% and preferred products lie within this range.

The bifunctional reagent used may include any etherifying agent containing two or more carbon atoms and two or more functional groups functioning to substitute the hydroxyl hydrogen atoms of cellulose. Bifunctional reagents containing only one carbon atom such as methylene sulfate and methylene chloride are not considered to be etherifying agents since their reaction with alcohols leads to acetals. The bifunctional reagent must be an etherifying agent for cellulose; that is, it must be a compound which, when reacted with cellulose in the presence of alkali, reacts at least in part with both etherifying radicals to give a cellulose ether group which is linked to the cellulose nucleus in at least two positions. This includes etherifying agents which must be used in the presence of small proportions of low molecular weight activating groups in order to achieve sensible degree of substitution. Halogen derivatives containing halogen attached to secondary carbon atoms are not generally useful, however. To be effective, the bifunctional etherifying agent should preferably have the functional groups attached to primary carbon atoms. Among the etherifying agents which may be used are epichlorhydrin, ethylene dichloride, dichlorodiethyl ether, xylylene dibromide, trimethylene chloride, omega,omega-dichlorodipropyl ether and beta,beta-dichlorodiethyl sulfide.

Polyfunctional reagents other than bifunctional reagents may be used by following the teachings of the present invention, but the result is in general, less satisfactory than when a bifunctional reagent is used when more than two functioning groups are present. As starting materials for the reaction there may be used cellulose in any of the forms used in the preparation of soluble cellulose ethers. This includes purified cotton linters, high alpha wood cellulose, sulfite cellulose, regenerated cellulose, chemically modified cellulose such as hydrocellulose and oxidized cellulose, and cellulose hydrate. As a preliminary to further reaction the cellulose may be etherified to a low degree to form soluble or insoluble cellulose ethers such as methyl cellulose, hydroxyalkyl cellulose and cellulose glycolic acid ether.

The most important use of the invention is to increase the viscosity of cellulose ethers in order to adapt them for use as thickening agents. The most important cellulosic thickening agents are the water-soluble ethers. For this reason the process of the invention is particularly applicable to the preparation of high viscosity water-soluble ethers. The process of the invention is also useful in the preparation of organic solvent-soluble cellulose ethers adapted for use as thickening agents. This is especially true of those agents which are derived from higher molecular weight etherifying agents such as butyl, amyl and dodecyl chlorides where ordinarily so great degradation occurs to the cellulose chain during preparation of the ether that the resulting product is of very low viscosity and, hence, of every poor thickening power. In such instances it is possible to overcome the effects of degradation by the use of a bifunctional reagent to give products of very considerably increased thickening power.

The principal advantage of the invention lies in the improved viscosity of the products of the invention and, hence, their greater suitability for use as thickening materials. In general, a thickening agent is used for the purpose of giving body to a normally less viscous solution. This bodying effect may be for the purpose of hindering precipitation of insoluble materials or to convert the solution to a form in which it can be more conveniently handled. In most cases where thickening agents are used the thickening material acts simply as a filler and must be present only in sufficient quantity to give the proper viscosity. Obviously where the thickening agent can be dissolved to solutions of higher viscosity, less thickening agent can be used. The present invention provides an important advance over the prior art in that it permits the production of thickening agents which can be used in smaller quantities to give a given thickening effect than previously known cellulose ethers. Accordingly, it provides a means of thickening such dispersions at a considerably lower cost than previously known cellulose ether thickening agents. The practicability of using these derivatives in lower concentration than had hitherto been possible also permits other less obvious advantages. In those instances where the thickening agent is present only as an inert substance, it is of advantage to have as little of the material present as possible. The use of the material in printing pastes for printing textiles is an important illustration of this point. Where the quantity of the thickening material is low, considerably brighter prints are obtained than with smaller concentrations of thickener. In the preparation of emulsion-type paints reduction in the quantity of thickening agent reduces the water-sensitivity of the product. In food products the lower the quantity of thickener used, the less the flavor of the other ingredients is altered thereby.

As many apparently widely different embodiments of this invention may be made without departing from the spirit and scope thereof, it is to be understood that I do not limit myself to the specific embodiments thereof except as defined in the appended claims.

I claim:

1. Process of preparing a soluble cellulose ether of high viscosity which comprises reacting cellulose with a monofunctional etherification reagent and with a bifunctional etherification reagent which reacts with cellulose to form an ether having two ether linkages between the cellulose nucleus and a single etherifying group, to effect substitution by the monofunctional reagent to a degree to form a soluble ether with the cellulose, and to effect substitution with a bifunctional reagent to a degree that the cellulose ether contains from about $1/5000$ mol to about $1/4$ mol of the bifunctional substituent.

2. Process of claim 1 in which the reaction mixture contains both the mono- and the bifunctional etherification agent.

3. Process of claim 1 in which the reaction with the mono- and bifunctional reagent is carried out consecutively.

4. Process of claim 1 in which the cellulose is reacted first with the monofunctional reagent and the product is reacted with the bifunctional reagent.

5. The process of preparing soluble cellulose ethers of high viscosity which comprises simultaneously reacting cellulose with a monofunctional etherification agent and a bifunctional etherification agent which reacts with cellulose to form an ether having two ether linkages between the cellulose nucleus and a single etherifying group, the action with the former being carried out to the extent which in the absence of the latter reaction would result in a soluble monofunctional ether, the reaction with the bifunctional agent being carried out to the extent which results in an ether containing from about $1/5000$ mol to about $1/4$ mol of bifunctional etherification agent.

6. The process which comprises reacting cellulose with a monofunctional etherification agent under conditions which will result in a soluble product, and then reacting the same with a bifunctional etherification agent which reacts with cellulose to form an ether having two ether linkages between the cellulose nucleus and a single etherifying group, and stopping the latter reaction when the viscosity of the still soluble product has increased by at least 25%.

7. A water-soluble cellulose derivative of high viscosity containing therein monofunctional ether groups and from about $1/5000$ mol to about $1/4$ mol of bifunctional ether groups, said bifunctional ether groups being chemically combined with cellulose to form an ether having two ether linkages between the cellulose nucleus and a single etherifying group.

ROBERT W. MAXWELL.